United States Patent
Brumfield et al.

(10) Patent No.: US 9,254,623 B2
(45) Date of Patent: Feb. 9, 2016

(54) QUICK ASSEMBLING FURNITURE

(71) Applicants: Patrick Henry Brumfield, Erie, PA (US); William Brian Mitchell, Erie, PA (US)

(72) Inventors: Patrick Henry Brumfield, Erie, PA (US); William Brian Mitchell, Erie, PA (US)

( * ) Notice: Subject to any disclaimer, the term of this patent is extended or adjusted under 35 U.S.C. 154(b) by 0 days.

(21) Appl. No.: 13/694,563

(22) Filed: Dec. 13, 2012

(65) Prior Publication Data

US 2014/0169869 A1    Jun. 19, 2014

(51) Int. Cl.
| | |
|---|---|
| *B32B 5/18* | (2006.01) |
| *B32B 3/06* | (2006.01) |
| *A47B 47/04* | (2006.01) |
| *A47B 96/20* | (2006.01) |
| *F16B 12/12* | (2006.01) |

(52) U.S. Cl.
CPC ................. *B32B 5/18* (2013.01); *A47B 47/042* (2013.01); *A47B 96/205* (2013.01); *B32B 3/06* (2013.01); *F16B 12/125* (2013.01); *A47B 2230/0096* (2013.01); *Y10T 403/70* (2015.01); *Y10T 403/7062* (2015.01); *Y10T 428/24777* (2015.01); *Y10T 428/249987* (2015.04)

(58) Field of Classification Search
CPC .............................. B65D 21/0204; B65D 9/32
USPC .................................... 312/257.1, 263, 265.5
See application file for complete search history.

(56) References Cited

U.S. PATENT DOCUMENTS

| | | | | |
|---|---|---|---|---|
| 695,677 | A * | 3/1902 | Faris ................................ | 217/65 |
| 2,919,045 | A * | 12/1959 | Waugh et al. ................ | 220/4.34 |
| 3,405,835 | A * | 10/1968 | Eby ............................... | 220/4.34 |
| 5,690,400 | A * | 11/1997 | Tryon ............................ | 312/107 |
| 6,474,759 | B2 * | 11/2002 | Hsu ............................... | 312/263 |
| 7,770,340 | B2 * | 8/2010 | Heady et al. .................... | 52/107 |
| 8,147,012 | B2 * | 4/2012 | Green ......................... | 312/348.2 |
| 8,388,073 | B2 * | 3/2013 | Richter ......................... | 312/108 |

* cited by examiner

*Primary Examiner* — Daniel Rohrhoff
(74) *Attorney, Agent, or Firm* — MU Patents; Timothy Marc Shropshire

(57) ABSTRACT

The invention is directed to furniture such as of floor independently standing or wall mounted furniture, cabinetry, containers, boxes that can be lightweight, modular, easily assembled and disassembled.

17 Claims, 13 Drawing Sheets

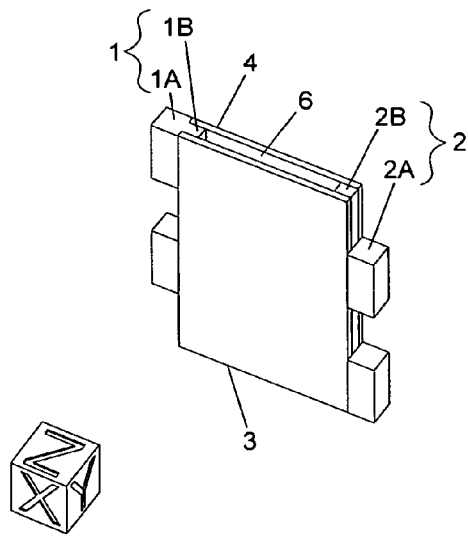
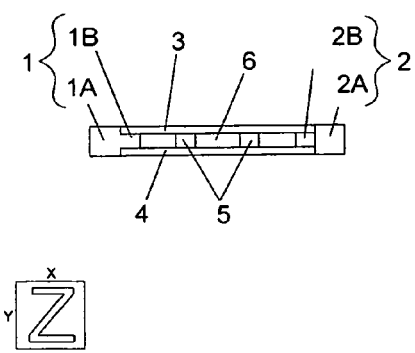
Figure 9
Figure 10
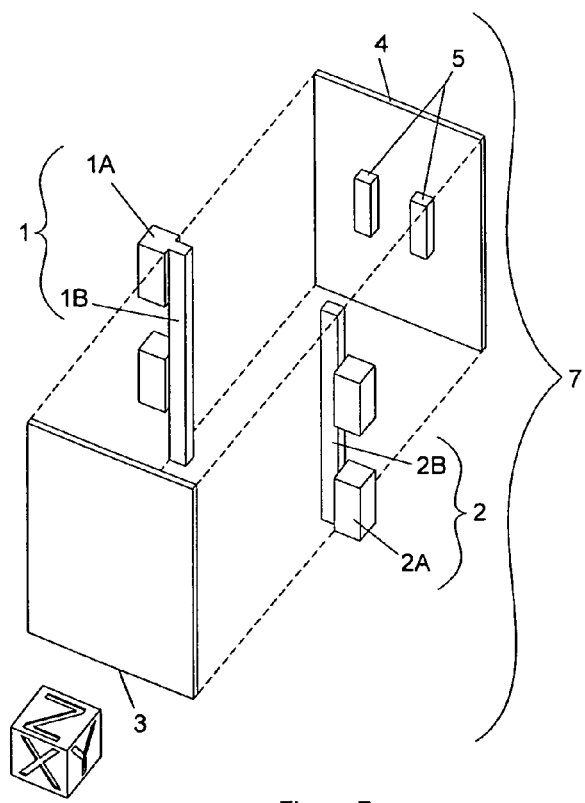
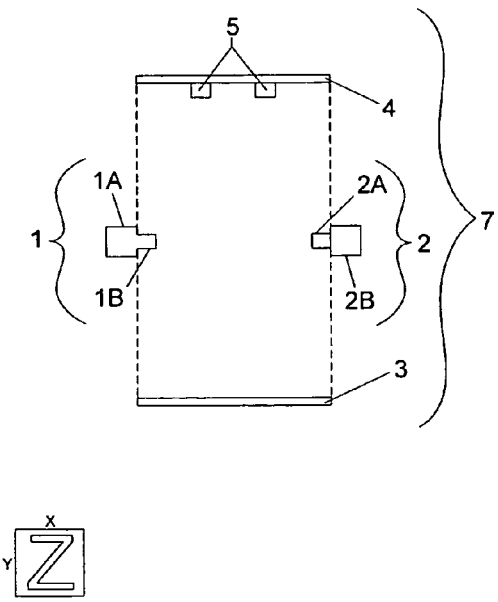
Figure 7
Figure 8

QUICK ASSEMBLING FURNITURE

BACKGROUND OF THE INVENTION

The invention is directed towards the common issues with current designs of cabinetry and Ready To Assemble furniture known as RTA furniture.

The current large RTA furniture designs such as a desk are heavy and densely packaged in a single box that is difficult to transport for the consumer from point of purchase to the desired location.

The current large RTA furniture designs contain a large assortment of different assembly parts that require a considerable amount of time and area to assemble. The large assortment of parts increase the level of difficulty of the furniture assembly.

The current cabinetry and RTA furniture designs are comprised of compressed particles of wood and adhesive covered by a veneer surface that warp, weaken and disintegrate over time when it comes in contact with water or moisture.

The current RTA furniture designs require you to use a glue or adhesive that makes disassembly nearly impossible without damaging the furniture.

The current large RTA designs that are fully assembled are difficult to move from one area to another. The weight of the furniture is too heavy for the assembly joints. Typically the joints of the furniture crack or become damaged. The broken furniture is then considered undesirable and not repairable by the consumer and discarded into our landfills.

The current RTA designs have square sharp edges which are dangerous for children. A child or adult head can be seriously injured if he or she falls and their head comes in contact this edge.

DETAILED DESCRIPTION OF THE PREFERRED EMBODIMENT

Note: An axis block is placed with each figure to assist the viewer determine the viewing angle. Each axis block is marked on opposite sides X, Y and Z corresponding to the figures axis. The X axis is referring to left and right. The Y axis is referring to front and back. the Z axis is referring to top and bottom.

Referring now to FIGS. 1, 2, 3, 4, 5 and 6, depicts the Panel edge 1 contains segment(s) 1A and Panel edge tab 1B. The Panel edge 1 can be made from a single piece of material or multiple pieces of material.

In further detail, to FIGS. 1, 2, 3, 4, 5 and 6, depicts six views of Panel edge 1, depicting the basic shape.

In further detail, FIGS. 1, 2, 3, 4, 5 and 6, depicts the Panel edge segment(s) 1A. The number of segments and distance between them can be varied for appearance, use of spacers, construction and/or manufacturing benefits.

In further detail, FIGS. 1, 2, 3, 4, 5 and 6, depicts the Panel edge segment(s) are spaced apart equally the same width as the segment(s) width. This equal spacing allows the Panel edge segment to interconnect or mesh with an inverted Panel edge with identical spacing which is further discussed in pages 6 and 7.

In further detail, FIGS. 1, 2, 3, 4, 5 and 6, depicts the Panel edge segment(s) are spaced apart equally the same width as the segment(s) width. The Panel edge segment(s) 1A, size, width and spacing can vary on Panel edge 1 but must correspond to the size, width and spacing of an inverted interconnecting or meshing segments of another Panel edge 1.

In further detail, FIGS. 1, 2, 3, 4, 5 and 6, depicts Panel edge tab 1B. The dimensions are dependent on the construction or design desired of the finished product.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 7 and 8, depicts two different views of an unassembled Panel 7.

In further detail, FIGS. 7 and 8, depicts that Panel edge 1, Panel edge 2, Panel face 3, Panel face 4 and Panel separator(s) 5 make up Panel 7.

In further detail, FIGS. 7 and 8, depicts that Panel edge 1 and 2 being similar in shape.

In further detail, FIGS. 7 and 8, depicts that the panel edge 1 and 2 are aligned on the Y-axis but separated on the Y-axis to allow Panel face 3 and 4 to be placed on each opposite side of the Panel edge tab 1B and 2B.

In further detail, FIGS. 7 and 8, depicts that the Panel edge 2 is aligned with Panel edge 1 on the Y-axis and Panel edge 2 is rotated approximately 180 degrees on the X-axis in reference to panel edge 1.

In further detail to FIGS. 7 and 8, depicts Panel edge 1 and 2 are separated on the Y-axis. The dimension of this separation is dependent on the Y-axis dimension of the Panel face 3 and 4.

In further detail to FIGS. 7 and 8, depicts Panel face 3 and 4. The physical dimensions of Panel face 3 and 4 are dependent only on the desired construction and/or design.

In further detail to FIGS. 7 and 8, depicts Panel Separator 5 that will provide support and separation between Panel face 3 and 4. The number of panel separators and positioning is dependent on the construction and/or desired design.

Referring now to FIGS. 9 and 10, depicts two different views of Panel 7 assembled In further detail to FIGS. 9 and 10, depicts the Panel face 3 and 4 are assembled on the opposite sides of Panel edge tab 1B and 2B.

In further detail to FIGS. 9 and 10, depicts the Panel separator 5 is equal in the X-axis dimension to the X-axis dimension of Panel edge tab 1B and 2B.

In further detail to FIGS. 9 and 10, the Panel support 5 and the Panel edge 1 and 2 can be secured to the Panel face 3 and 4 by adhesive, chemical or natural bonding or by mechanical means or any combination of the aforementioned means of securement.

In further detail to FIGS. 9 and 10, depicts Panel void 6, which is the separation area between the Panel face 3 and 4. The purpose of this void is further detailed in FIGS. 22 and 23.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 11, 12 and 13, depicts the cap edge 8 includes components Cap edge group 8A, Cap edge face 8B and 8C, Cap edge tab 8D and Cap edge cutout 8E and 8F.

In further detail to FIGS. 11, 12 and 13, depicts Cap edge group 8A having opposing mitered edges Cap edge face 8B and 8C.

In further detail to FIGS. 11, 12 and 13, depicts Cap edge tab 8D protrudes from cap edge group 8A on the Y axis.

In further detail to FIGS. 11, 12 and 13, depicts cap edge tab cutouts 8E, 8F on opposite ends on the X axis and opposite sides of the Cap edge tab 8D on the Z axis.

Referring now to FIGS. 14 and 15, depicts the Cap edge 8 and that Cap edges 9, 10 and 11 are identical in shape and size to cap edge 8 in FIGS. 11, 12 and 13

In further detail to FIGS. 14 and 15, depicts the cap edges 8, 9, 10 and 11 are placed so that the corners are adjacent to each other and spaced apart from each other on the X-Y axis plane.

In further detail to FIGS. 14 and 15, depicts the cap edges 8, 9, 10 and 11 are aligned on the X-Y axis plane.

Referring now to FIGS. 16 and 17, depicts the cap edges 8, 9, 10 and 11 assembled on the X-Y axis plane resulting in cap edge group 12.

In further detail to FIGS. 16 and 17, depicts the cap edges 8 and 9 assembled so that cap edge face 8C is assembled or faced with the adjacent face 9B resulting in an outside corner.

In further detail to FIGS. 16 and 17, depicts the cap edges 9 and 10 assembled so that cap edge face 9C is assembled or faced with the adjacent face 10B resulting in an outside corner.

In further detail to FIGS. 16 and 17, depicts the cap edges 10 and 11 assembled so that cap edge face 10C is assembled or faced with the adjacent face 11B resulting in an outside corner.

In further detail to FIGS. 16 and 17, depicts the cap edges 11 and 8 assembled so that cap edge face 11C is assembled or faced with the adjacent face 8B resulting in an outside corner.

In further detail to FIGS. 16 and 17, depicts the cap edges 8 and 9 interconnected by the overlapping of the Cap edge cutouts 8F and 9E resulting in an inside corner edge.

In further detail to FIGS. 16 and 17, depicts the cap edges 9 and 10 interconnected by the overlapping of the Cap edge cutouts 9F and 10E resulting in an inside corner edge.

In further detail to FIGS. 16 and 17, depicts the cap edges 10 and 11 interconnected by the overlapping of the Cap edge cutouts 10F and 11E resulting in an inside corner edge.

In further detail to FIGS. 16 and 17, depicts the cap edges 11 and 8 interconnected by the overlapping of the Cap edge cutouts 11F and 8E resulting in an inside corner edge.

In further detail to FIGS. 16 and 17, depicts that mating the cap edges 8, 9, 10 and 11 creates Cap edge group 12a.

In further detail to FIGS. 16 and 17, depicts that Cap edge group 12A is a square type frame with a recessed inside edge on both sides of the frame on the Z axis.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIG. 18 depicts an angled view of the unassembled Cap 16 which is made up of components, cap panels 13A and 13B, cap edge group 12 and cap separator 14.

In further detail to FIG. 18 depicts cap Separator 14, this is placed on the Panel face 13B and will provide support and separation between the Cap face 13A and 13B. The number of panel separators and positioning is dependent on the desired structural design.

In further detail to FIG. 18, depicts the cap panel 13A, cap edge group 12 and cap panel 13B centered on the Z axis but spaced apart on the Z axis.

In further detail to FIG. 18 depicts cap Separator 14 providing support and separation between the Cap face 13A and 13B.

Referring now to FIG. 19 depicts a frontal view of the same items as item 18 with the cap edge 9 and 11 removed to better depict where the cap panels 13A and 13B are to be positioned on the cap edge tabs 8D and 10D.

Referring now to FIG. 20 depicts an angled view that cap panels 13A and 13B, cap edge group 12 and cap separator 14 assembled create Cap 15.

In further detail to FIG. 20 depicts the Cap panel 13A is positioned on the top inside recessed edge of Cap edge group 12.

In further detail to FIG. 20 depicts the Cap panel 13B is positioned on the bottom inside recessed edge of Cap edge group 12.

In further detail to FIG. 20, the Cap panels 13A and 13B can be secured to the Cap edge group 12 by adhesive, chemical or natural bonding or by mechanical means or any combination of the aforementioned means of securement.

Referring now to FIG. 21, depicts a frontal view of the same items as item 18 with the cap edge 9 and 11 removed to better depict how the cap face 13A and 13B are positioned on the cap edge tabs 8D and 10D.

In further detail to FIG. 21, depicts cap Separator 14 between cap face 13A and 13B, this provides support and separation between the Cap face 13A and 13B. The number of panel separators and positioning is dependent on the desired design.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 22 and 23, depicts two views of panel 7 being filled with a foam polymer or similar material into the panel void 6 opening of panel 7. The foam type polymer will act as an adhesive to the inside surfaces of panel 7 and when dried the foam cell structure will provide internal support for the panel 7, The foam polymer or similar material can be inserted into the void 6 instead as a solid mass and adhered to the inside surfaces by a glue or adhesive.

Referring now to FIGS. 24 and 25, depicts two views of panel void access hole 18. Panel void access hole 18 was created to provide external access to the Cap void 16. In further detail, to FIGS. 24 and 25, depicts two views of panel void access holes 18. The arrangement and size can be based on material inserted into Cap void 16. The number of holes is dependent on the material to provide expansion relief.

In further detail, FIGS. 24 and 25, depicts two views of cap 15 being filled with a foam polymer or similar material through the opening of panel void access hole 18. The foam type polymer will act as an adhesive to the inside surfaces of cap 13A and when dried the foam provides adherence and/or internal support for the cap 13, The foam can be inserted into the void as a solid mass and adhered to the inside surfaces by a glue or adhesive.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 26 and 27, depicts two views of panel 7, panel edge and panel edge cover 20.

Referring now to FIGS. 28 and 29, depicts two views of 19 and panel edge cover 20 assembled together resulting in panel corner 21.

In further detail, FIGS. 28 and 29, depicts two views of panel corner group 21 and panel 7 unassembled.

Referring now to FIGS. 30 and 31, depicts two views of panel corner group 21 and panel 7 assembled by aligning the interconnecting segments of panel 7 and panel corner group 21.

In further detail FIGS. 30 and 31, the positioning lines for mating the segments of panel corner group 21 and panel 7 resulting in a solid corner.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 32 and 33, depicts two views of panel 7, panel 7A and Panel corner group 21 and cap corner group 21A unassembled.

In further detail FIGS. 32 and 33, depicts the mating lines of panel 7 and panel corner group 21 and the mating lines of panel 7A and panel corner group 21A.

Referring now to FIGS. 34 and 35, depicts two views of panel 7, panel 7A, panel 7B and cap corner edge group 21 and cap corner edge group 21A.

In further detail FIGS. 34 and 35, depicts the mating of panel 7 and panel corner group 21 and the mating of panel 7A and panel corner group 21A.

In further detail FIGS. 34 and 35, depicts the mating of panel 7 and panel corner group 21 results in panel corner group 22.

In further detail FIGS. 34 and 35, depicts the mating of panel 7A and panel corner group 21A results in panel corner group 22A.

In further detail FIGS. 34 and 35, depicts the mating lines of panel 7B with panel corner group 22 and panel corner group 22A.

Referring now to FIGS. 36 and 37, depicts panel 7B assembled with panel corner group 22 and panel corner group 22A.

In further detail FIGS. 36 and 37, depicts panel 7B, panel corner group 21A and panel corner 22A results in panel group 23.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 38 and 39, depicts two views of panel group 23, corner edge 24a, 24b, 24c, 24d blackened and dotted along the Z axis of the panel group 23 and centerline marks 25a, 25b, 25c, 25d.

In further detail FIGS. 38 and 39, depicts the corner edges 24a, 24b, 24c, 24d blackened and arced and extend the length of the panel group 23 marked by dotted lines.

In further detail FIGS. 38 and 39, depicts the centerline marks 25a, 25b, 25c, 25d centered on the Z-axis of each Panel edge segment of panel group 23.

Referring now to FIGS. 40 and 41, depicts two views of panel group 23 showing the outer corner edge radius 24a, 24b, 24c, 24d were subtracted from the Panel group 23 due to the material being excessive and unnecessary to the strength of the structure resulting in lighter edges.

In further detail FIGS. 40 and 41, depicts the Edge hole circle 26a, 26b, 26c, 26d to be subtracted which is centered on a centerline. Each hole will extend through the length of the panel group 23 along the Z-axis.

Referring now to FIGS. 42 and 43, depicts two views of panel group 23 displaying that Edge holes 27a, 27b, 27c, 27d were subtracted the entire length of the Panel.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 44 and 45 depicts two views of rod 28A aligned directly above the centerline on the Z-axis of the Edge hole 27a of panel group 23.

In further detail FIGS. 44 and 45 depicts two views of rod 28B each aligned directly above the centerline on the Z-axis of the Edge hole 27b of panel group 23.

In further detail FIGS. 44 and 45 depicts two views of rod 28C each aligned directly above the centerline on the Z-axis of the Edge hole 27c of panel group 23.

In further detail FIGS. 44 and 45 depicts two views of rod 28D each aligned directly above the centerline on the Z-axis of the Edge hole 27d of panel group 23. Referring now to FIGS. 46 and 47 depicts two views of rod 28A aligned on the centerline on the Z-axis and inserted fully through Edge hole 27a of panel group 23. In further detail FIGS. 46 and 47 depicts two views of rod 28B aligned on the centerline on the Z-axis and inserted fully through Edge hole 27b of panel group 23. In further detail FIGS. 46 and 47 depicts two views of rod 28C aligned on the centerline on the Z-axis and inserted fully through Edge hole 27c of panel group 23. In further detail FIGS. 46 and 47 depicts two views of rod 28D aligned on the centerline on the Z-axis and inserted fully through Edge hole 27d of panel group 23 In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 48 and 49 depicts cap 15A centered directly above the Panel edge body 23 and cap 15B centered directly below the Panel edge body 23 on the Z-axis.

In further detail, FIGS. 48 and 49 depicts the Cap edge hole 29A, 29B, 29C, 29D, each hole created in Cap 15A and Cap 15B are on the same Z-axis centerline of each corresponding rod 28A, 28B, 28C and 28D. The term Corresponding is referring to having the same suffix letter as itself.

In further detail, FIGS. 48 and 49 depicts the Cap edge hole 29A, 29B, 29C, 29D, each hole created in Cap 15A is slightly larger than each corresponding rod 28A, 28b, 28C and 28D on the Z-axis.

In further detail, FIGS. 48 and 49 depicts the Cap edge hole 29E, 29F, 29G, 29H, each hole created in Cap 15B is slightly larger than each corresponding rod 28A, 28B, 28C and 28D on the Z-axis.

Referring now to FIGS. 50 and 51 depicts Panel edge body 23 assembled with Cap 15A by inserting the rod 28A, 28B, 28C and 28D through each corresponding Cap edge hole 29A, 29B, 29C, 29D.

In further detail, FIGS. 50 and 51 depicts Panel edge body 23 assembled with Cap 15B by inserting the rod 28A, 28B, 28C and 28D through each aligned Cap edge hole 29E, 29F, 29G, 29H.

In further detail, FIGS. 50 and 51 depicts the end of each rod 28A, 28B, 28C, 28D extended through the corresponding Cap edge hole 29A, 29B, 29C, 29D.

In further detail, FIGS. 50 and 51 depicts the end of each rod 28A, 28B, 28C, 28D extended through the corresponding Cap edge hole 29E, 29F, 29G, 29H.

In further detail, FIGS. 50 and 51 depicts the Main body 30 contains rod 28A, 28B, 28C, 28D, Cap 15A and 15B and Panel edge body 23.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 52 and 53 depicts Corner cap nuts 31A, 31B, 31C, 31D each aligned on the centerline of each corresponding Rod 28A, 28B, 28C, 28D of the Z-axis.

In further detail, FIGS. 52 and 53 depicts Corner cap nuts 31A, 31B, 31C, 31D having a mating thread identical to Rod 28A, 28B, 28C, 28D.

Referring now to FIGS. 54 and 55 depicts Corner cap nuts 31A, 31B, 31C, 31D each threaded onto the corresponding Rod 28A, 28B, 28C, 28D.

In further detail, FIGS. 54 and 55 the Rods 28A, 28B, 28C, 28D extend through the Cap edge holes 29A, 29B, 29C, 29D.

In further detail, the components on this page can be constructed from any material, natural or synthetic that is suitable for the desired design of the product such as wood, wood by-product or plastic.

In further detail of this page, all dimensions are dependent on the desired final construction and/or design.

Referring now to FIGS. 56 and 57 depicts Foot 32A, 32B, 32C, 32D each aligned on the centerline of each corresponding Rod 28A, 28B, 28C, 28D.

In further detail, FIGS. 56 and 57 depicts Corner cap nuts 31A, 31B, 31C, 31D having a mating thread identical to Rod 28A, 28B, 28C, 28D.

Referring now to FIGS. 58 and 59 depicts Corner cap nuts 31A, 31B, 31C, 31D each threaded onto the corresponding Rod 28A, 28B, 28C, 28D.

Referring now to FIG. 60, 61, 62, 63 showing completed assembly 33.

DRAWINGS SHORT DESCRIPTION

FIG. 7 is a perspective view of a Quick assembling Furniture assembly

FIG. 8 is a top view of a Quick assembling Furniture assembly

FIG. 9 is a perspective view of a Quick assembling Furniture assembly

FIG. 10 is a top view of a Quick assembling Furniture assembly

Figure 5:
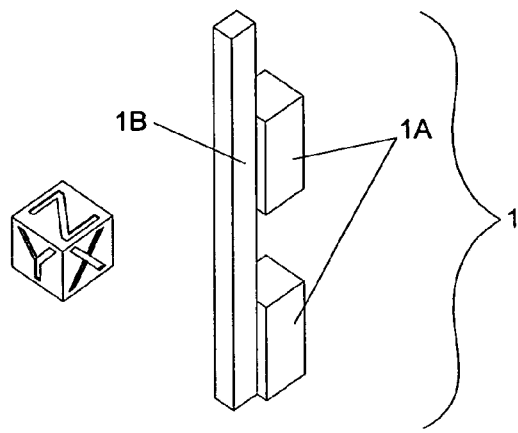
FIG. 5 is a perspective view of a Quick assembling Furniture assembly
Figure 6:
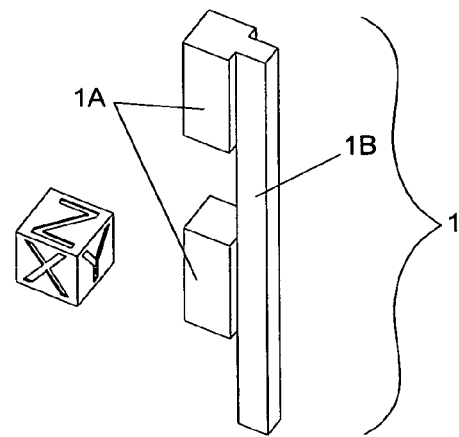
FIG. 6 is a perspective of a Quick assembling Furniture assembly
Figure 3:
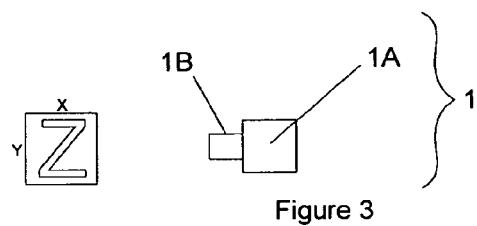
FIG. 3 is a top view of a Quick assembling Furniture assembly
Figure 4:
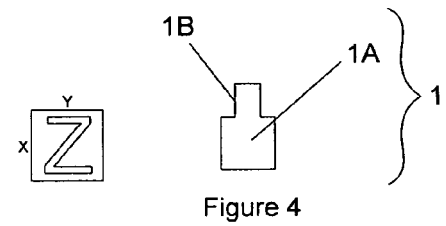
FIG. 4 is a bottom view of a Quick assembling Furniture assembly
Figure 1:
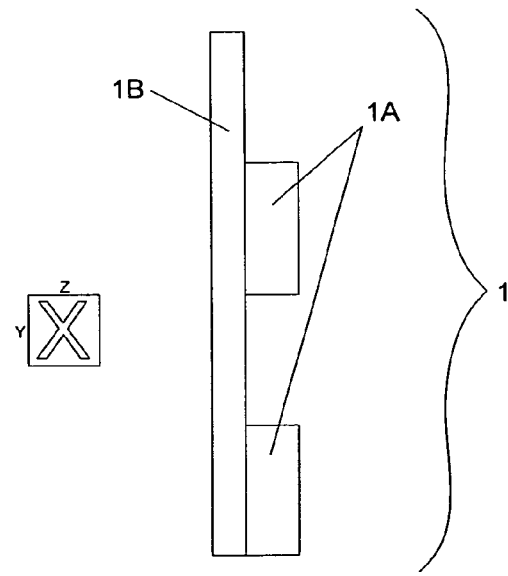
FIG. 1 is a side view of a Quick assembling Furniture assembly
Figure 2:
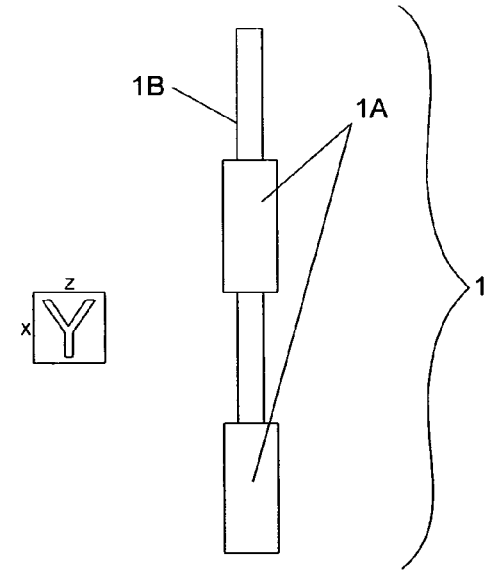
FIG. 2 is a front view of a Quick assembling Furniture assembly
Figure 16:
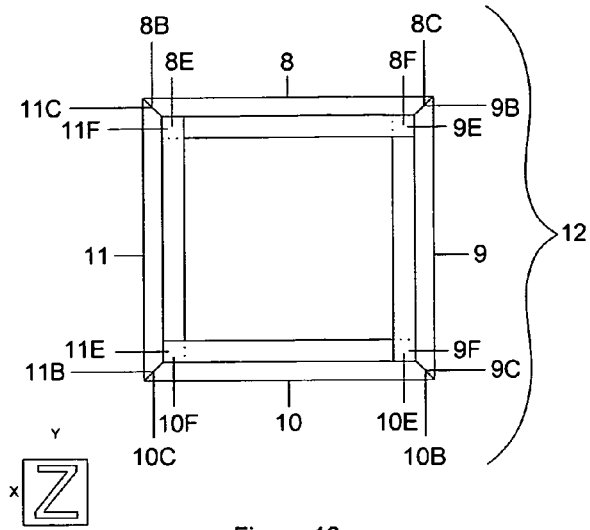
FIG. 16 is a perspective view of a Quick assembling Furniture assembly
Figure 17:
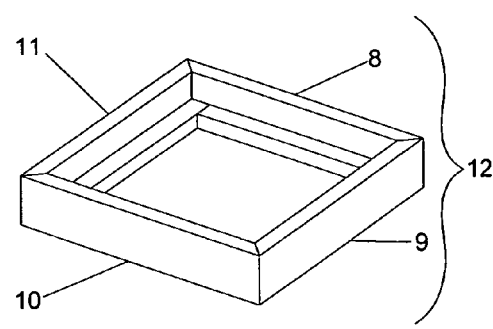
FIG. 17 is a perspective view of a Quick assembling Furniture assembly
Figure 14:
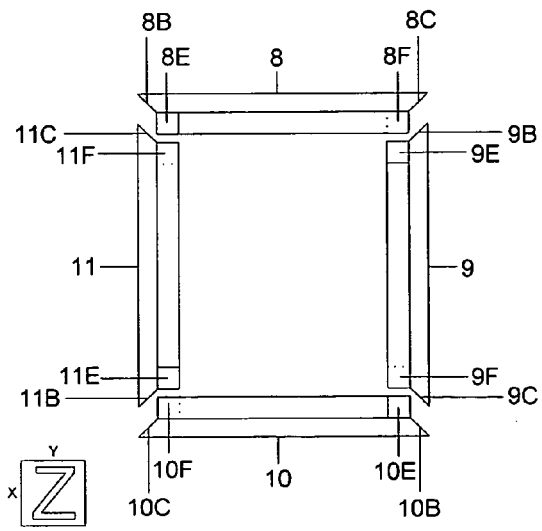
FIG. 14 is a top view of a Quick assembling Furniture assembly
Figure 15:
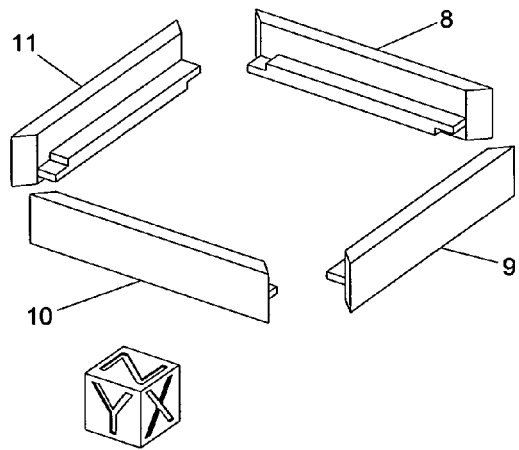
FIG. 15 is a top view of a Quick assembling Furniture assembly
Figure 11:
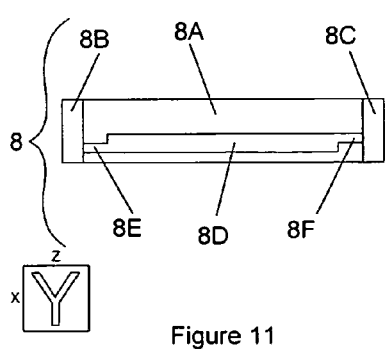
FIG. 11 is a front view of a Quick assembling Furniture assembly
Figure 12:
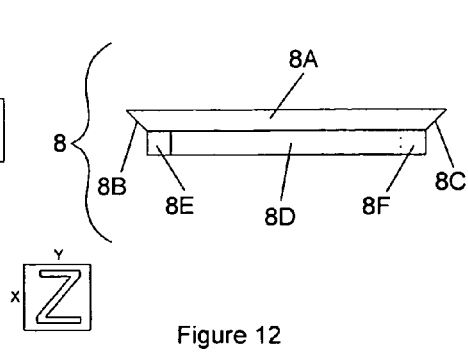
FIG. 12 is a top view of a Quick assembling Furniture assembly
Figure 13:
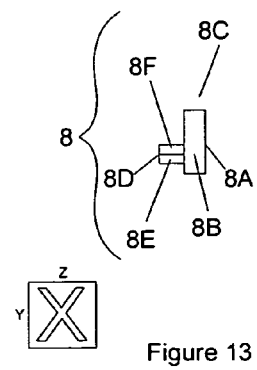
FIG. 13 is a side view of a Quick assembling Furniture assembly
Figure 20:
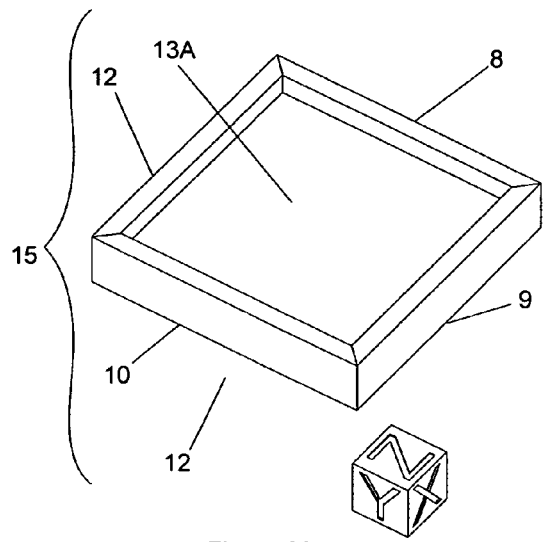
FIG. 20 is a front view of a Quick assembling Furniture assembly
Figure 21:
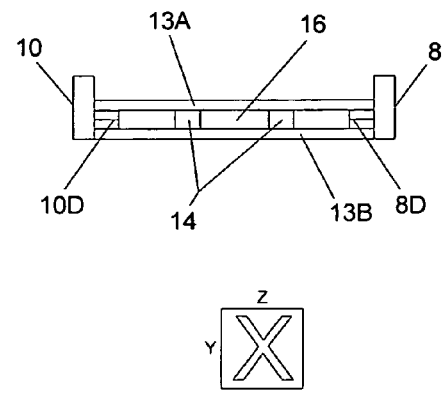
FIG. 21 is a front view of a Quick assembling Furniture assembly
Figure 18:
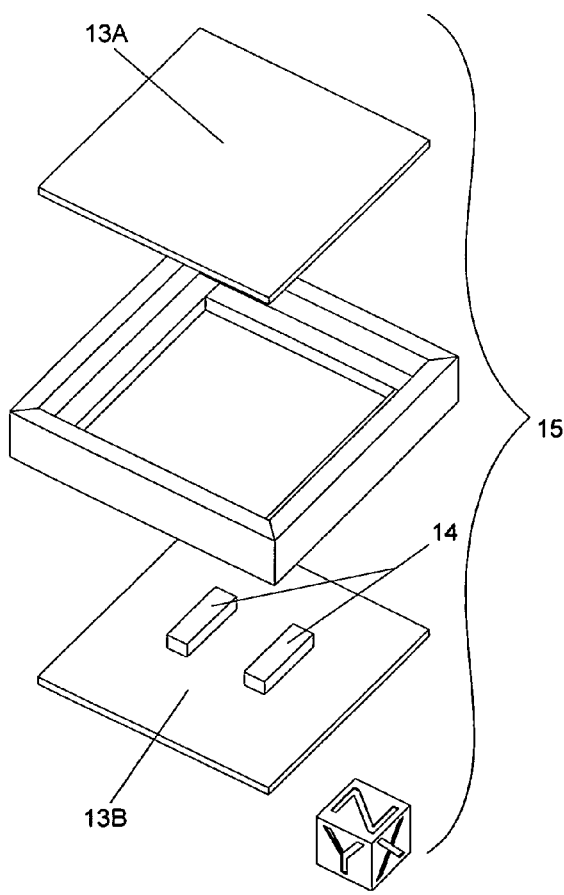
FIG. 18 is a perspective view of a Quick assembling Furniture assembly
Figure 19:
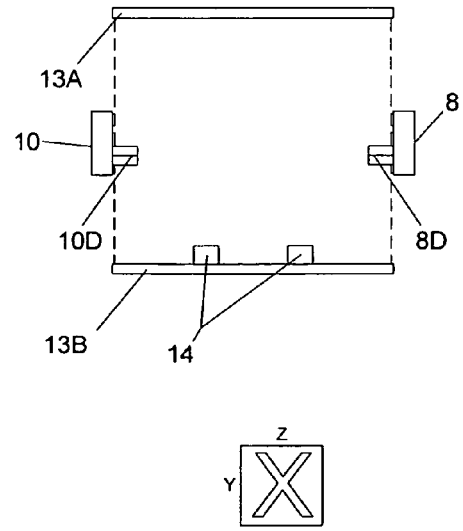
FIG. 19 is a perspective view of a Quick assembling Furniture assembly
Figure 24:
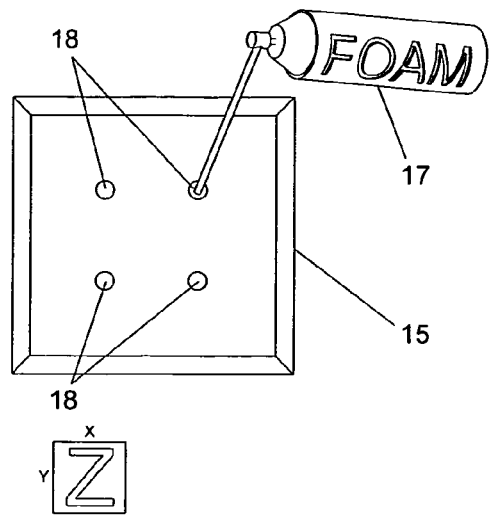
FIG. 24 is a perspective view of a Quick assembling Furniture assembly
Figure 25:
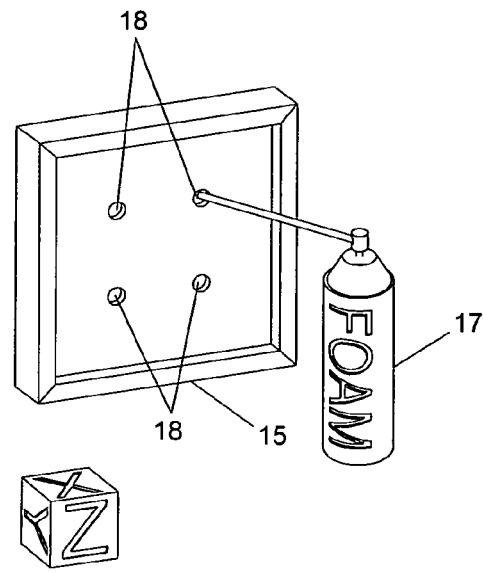
FIG. 25 is a perspective view of a Quick assembling Furniture assembly
Figure 22:
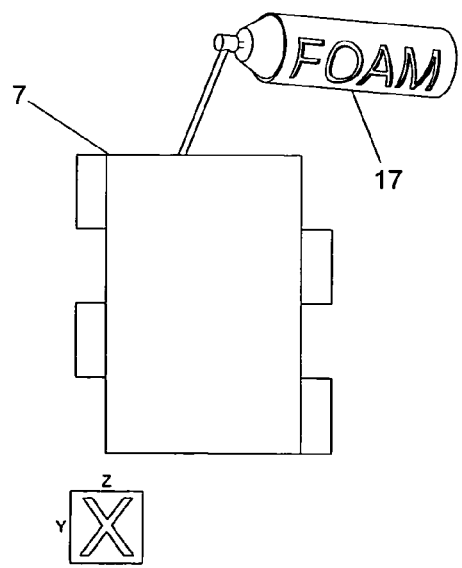
FIG. 22 is a side view of a Quick assembling Furniture assembly
Figure 23:
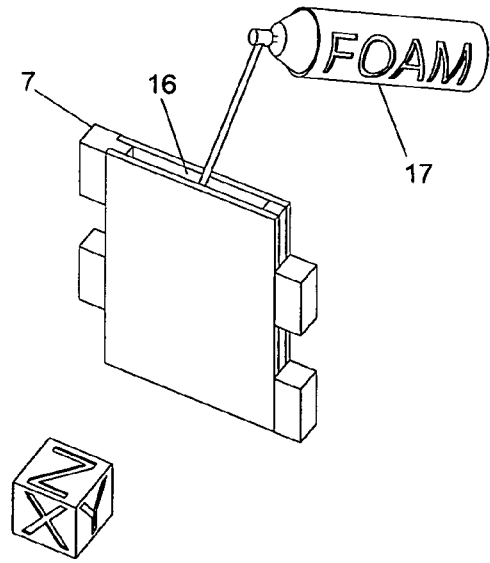
FIG. 23 is a top view of a Quick assembling Furniture assembly
Figure 30:
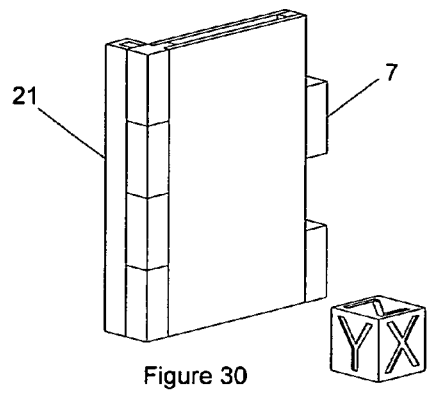
FIG. 30 is a top view of a Quick assembling Furniture assembly
Figure 31:
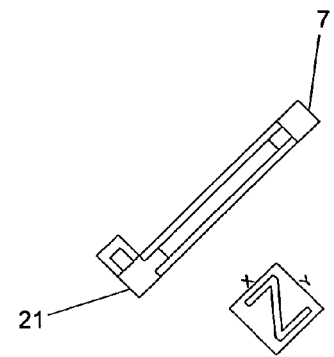
FIG. 31 is a top view of a Quick assembling Furniture assembly
Figure 28:
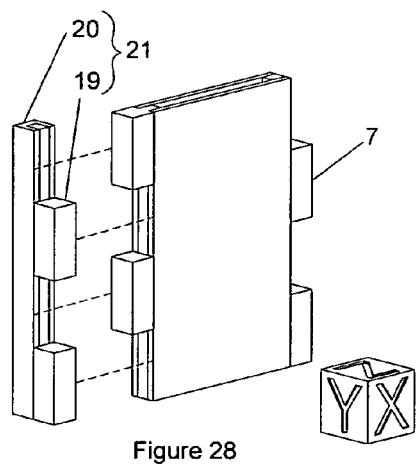
FIG. 28 is a perspective view of a Quick assembling Furniture assembly
Figure 29:
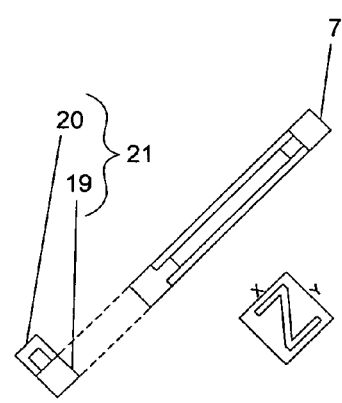
FIG. 29 is a top view of a Quick assembling Furniture assembly
Figure 26:
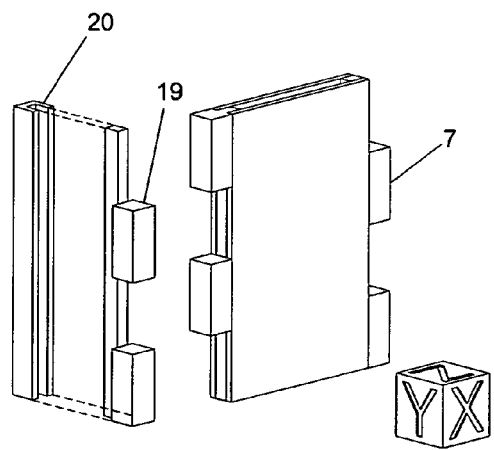
FIG. 26 is a perspective view of a Quick assembling Furniture assembly
Figure 27:
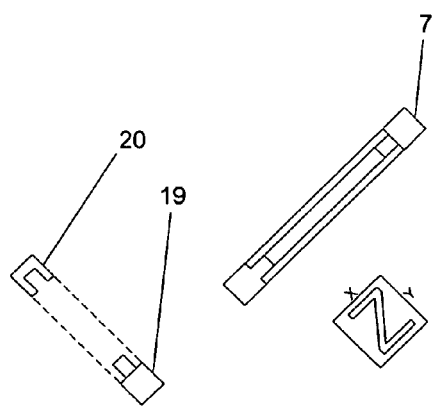
FIG. 27 is a perspective view of a Quick assembling Furniture assembly
Figure 36:
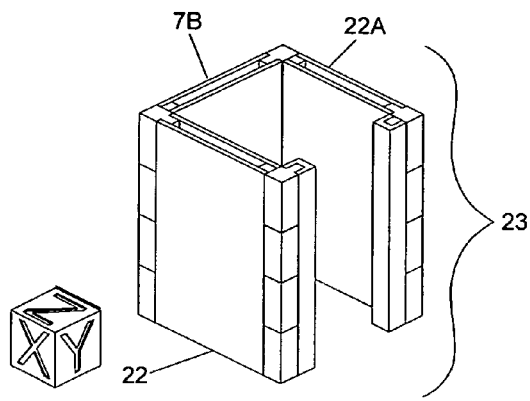
FIG. 36 is a perspective view of a Quick assembling Furniture assembly
Figure 37:
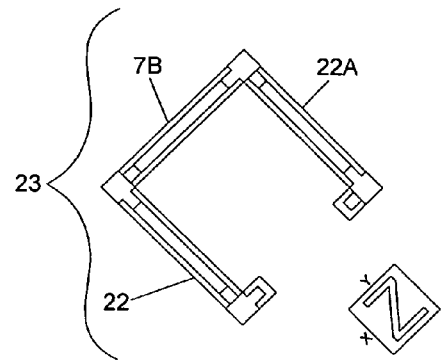
FIG. 37 is a top view of a Quick assembling Furniture assembly
Figure 34:
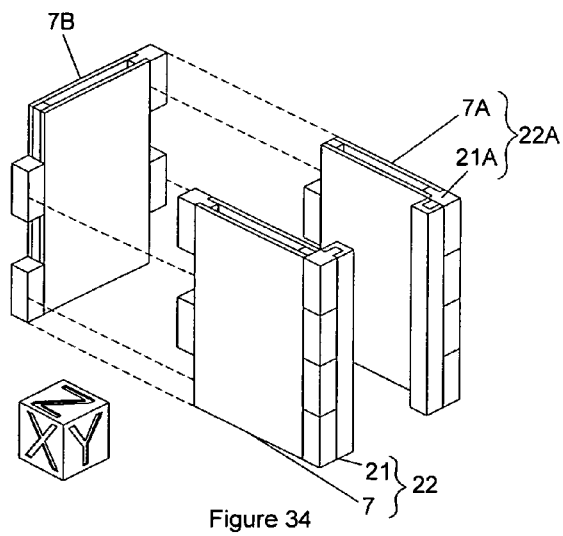
FIG. 34 is a perspective view of a Quick assembling Furniture assembly
Figure 35:
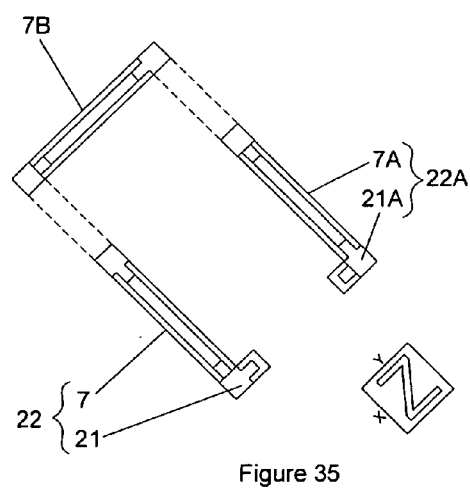
FIG. 35 is a top view of a Quick assembling Furniture assembly
Figure 32:
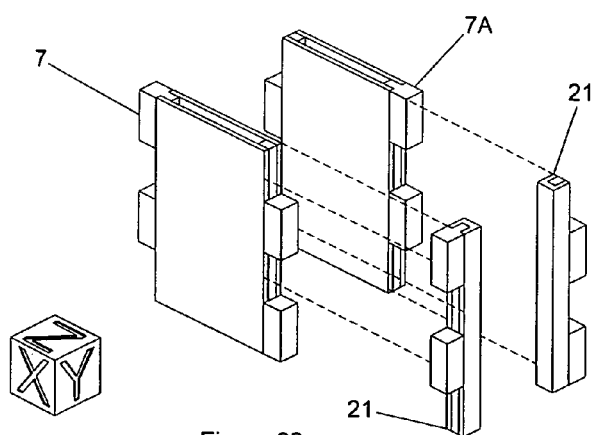
FIG. 32 is a perspective view of a Quick assembling Furniture assembly
Figure 33:
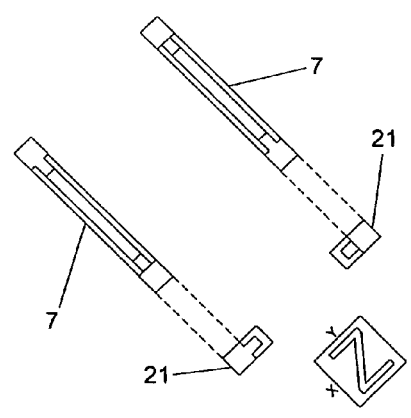
FIG. 33 is a top view of a Quick assembling Furniture assembly
Figure 42:
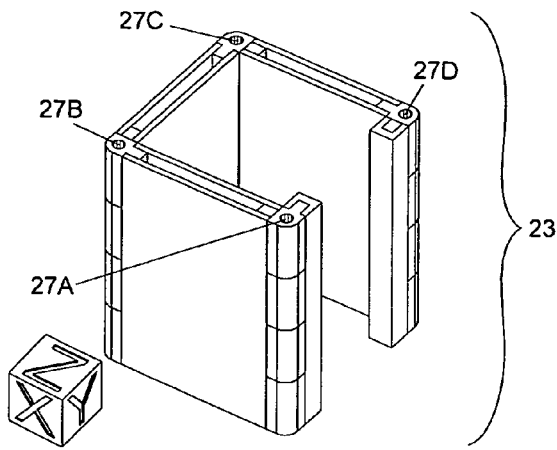
FIG. 42 is a perspective view of a Quick assembling Furniture assembly
Figure 43:
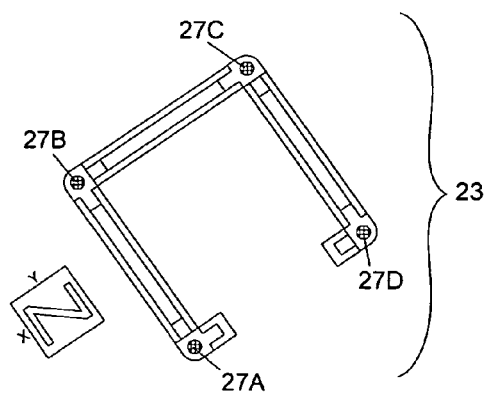
FIG. 43 is a front view of a Quick assembling Furniture assembly
Figure 40:
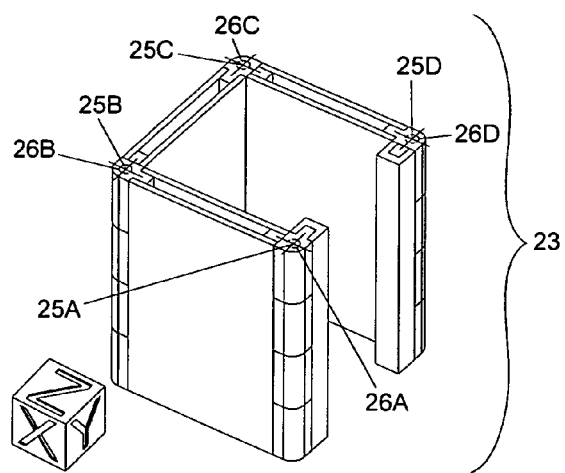
FIG. 40 is a perspective view of a Quick assembling Furniture assembly
Figure 41:
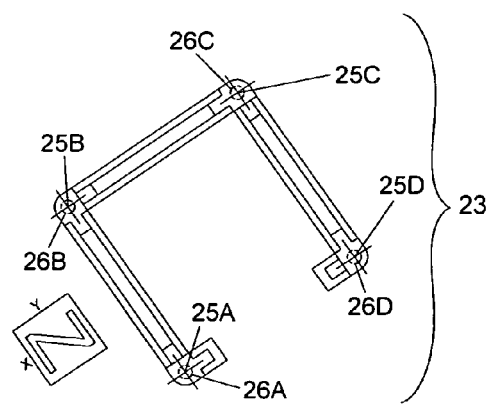
FIG. 41 is a top view of a Quick assembling Furniture assembly
Figure 38:
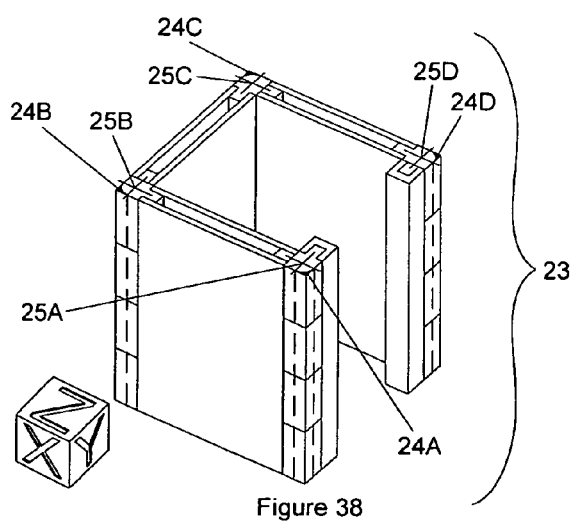
FIG. 38 is a perspective view of a Quick assembling Furniture assembly
Figure 39:
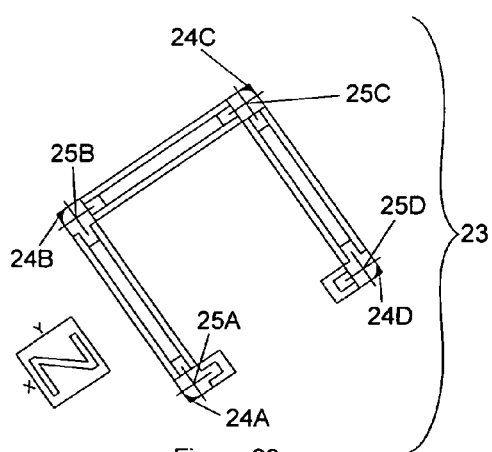
FIG. 39 is a top view of a Quick assembling Furniture assembly
Figure 46:
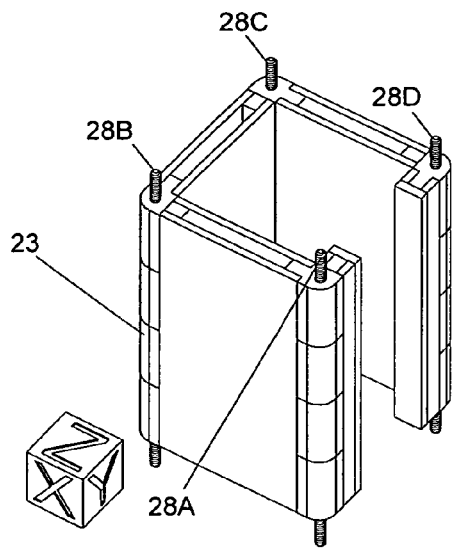
FIG. 46 is a perspective view of a Quick assembling Furniture assembly
Figure 47:
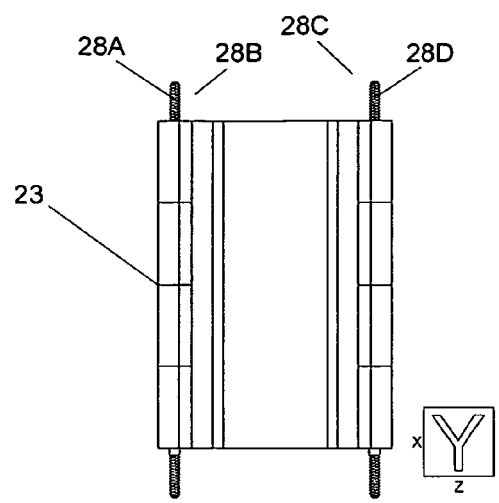
FIG. 47 is a front view of a Quick assembling Furniture assembly
Figure 44:
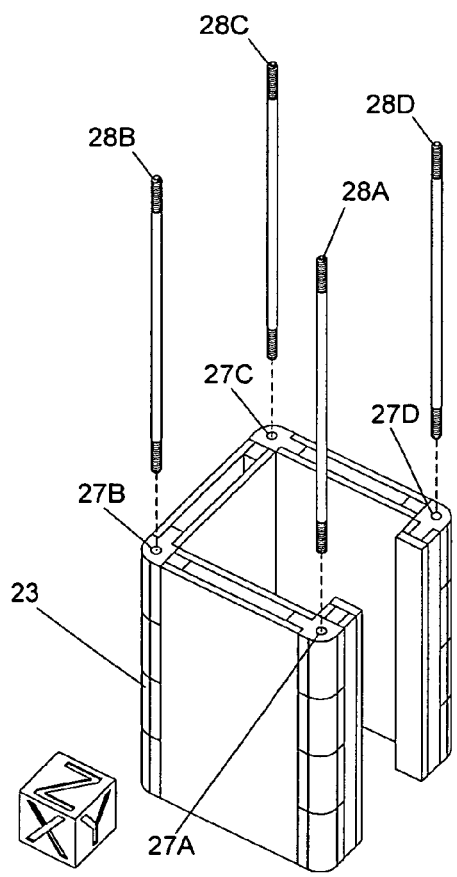
FIG. 44 is a perspective view of a Quick assembling Furniture assembly
Figure 45:
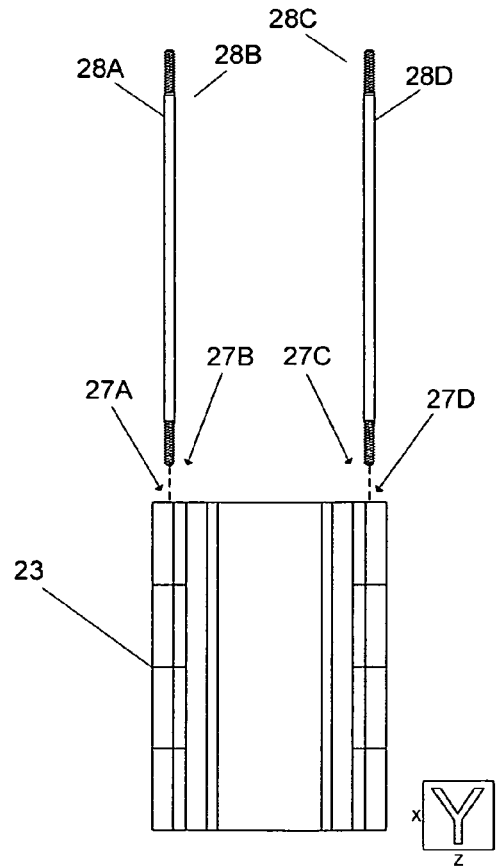
FIG. 45 is a front view of a Quick assembling Furniture assembly
Figures 50, 51:
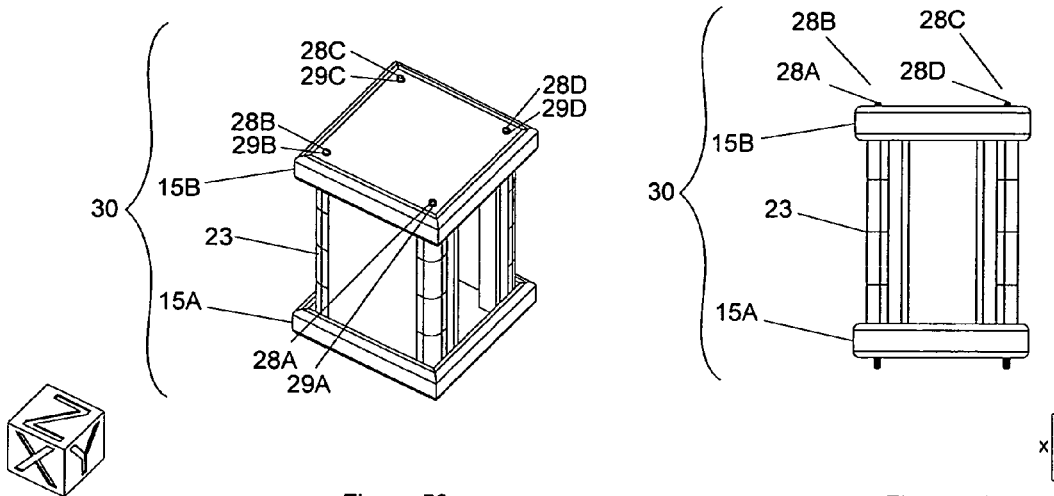
FIG. 50 is a perspective view of a Quick assembling Furniture assembly
FIG. 51 is a front view of a Quick assembling Furniture assembly
Figures 48, 49:
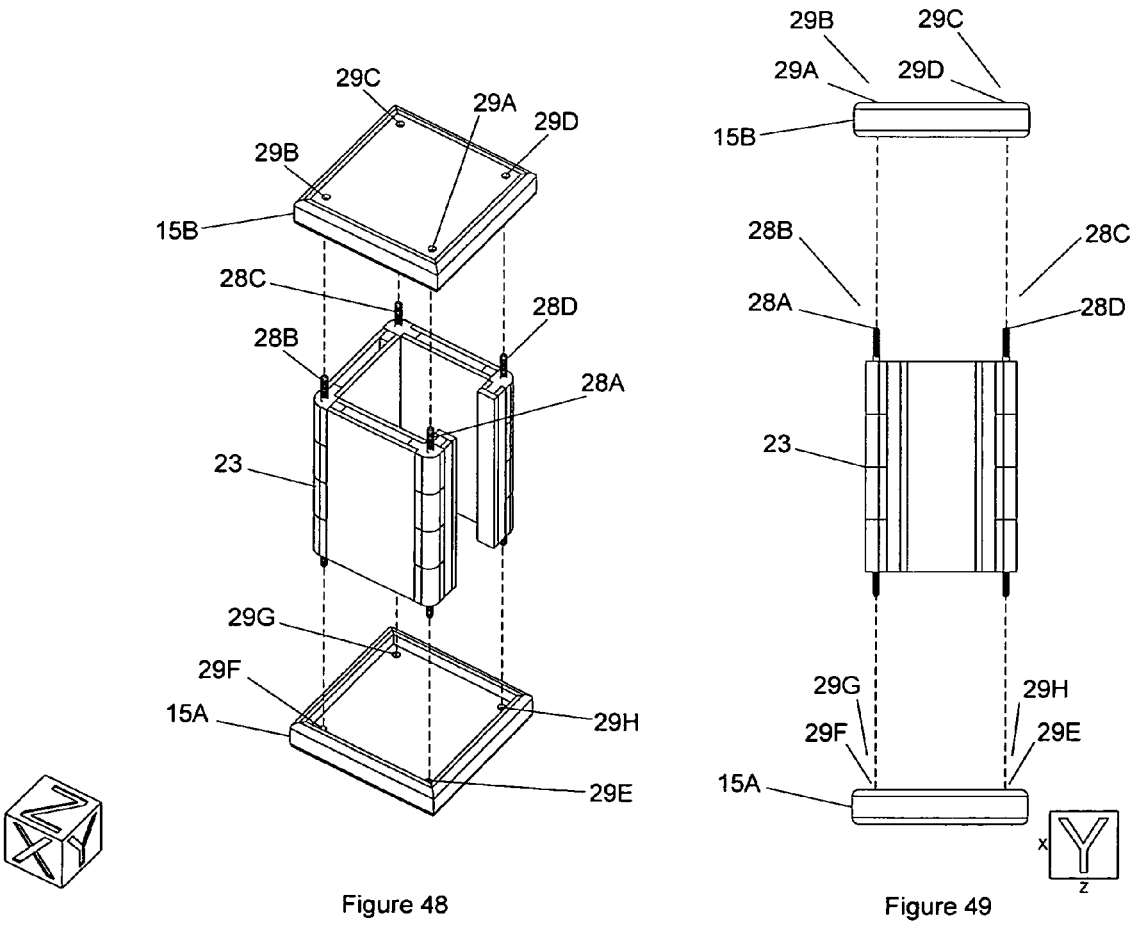
FIG. 48 is a perspective view of a Quick assembling Furniture assembly
FIG. 49 is a front view of a Quick assembling Furniture assembly
Figure 54:
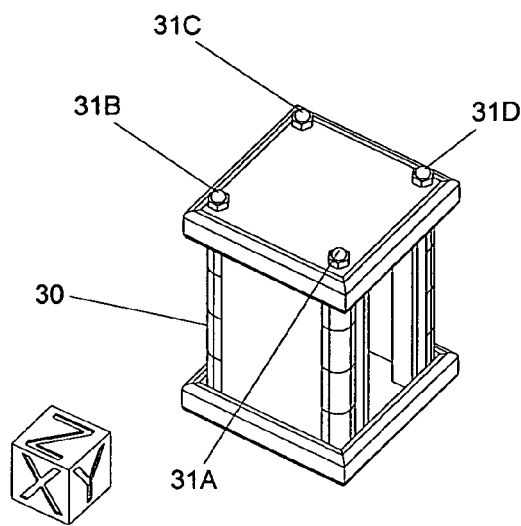
FIG. 54 is a perspective view of a Quick assembling Furniture assembly
Figure 55:
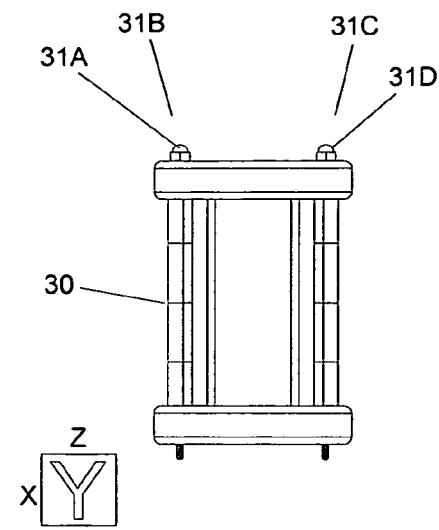
FIG. 55 is a front view of a Quick assembling Furniture assembly
Figure 52:
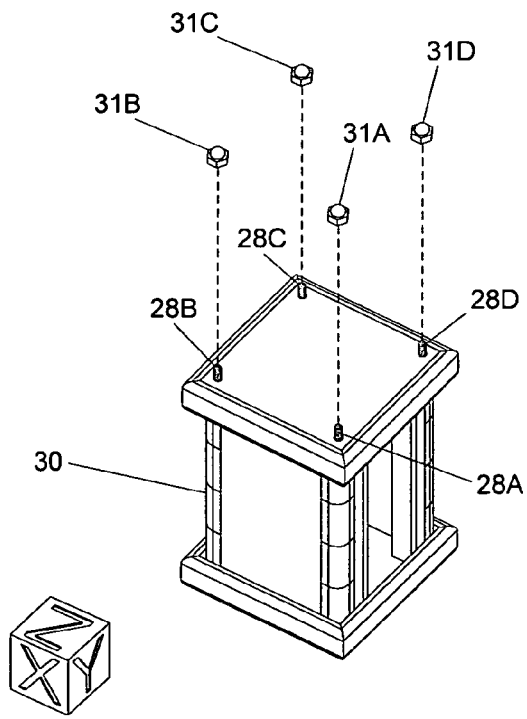
FIG. 52 is a perspective view of a Quick assembling Furniture assembly
Figure 53:
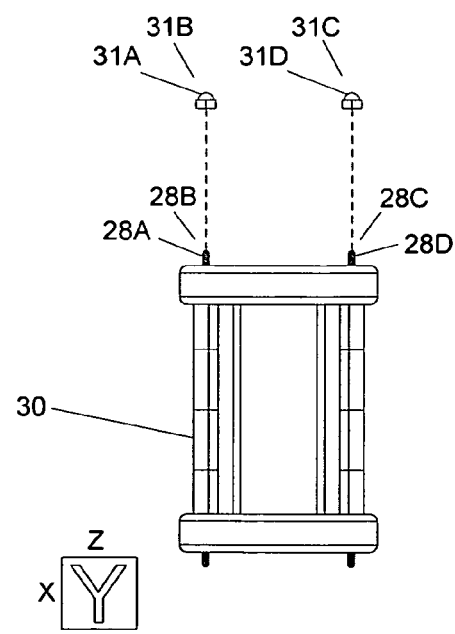
FIG. 53 is a front view of a Quick assembling Furniture assembly
Figure 58:
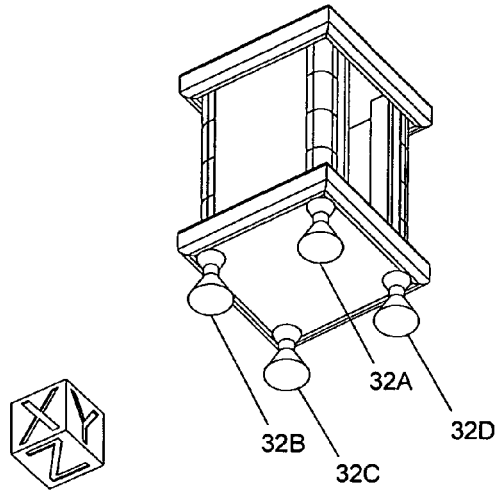
FIG. 58 is a perspective view of a Quick assembling Furniture assembly
Figure 59:
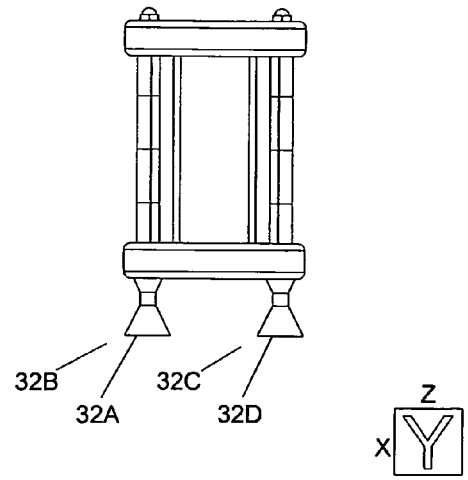
FIG. 59 is a front view of a Quick assembling Furniture assembly
Figure 56:
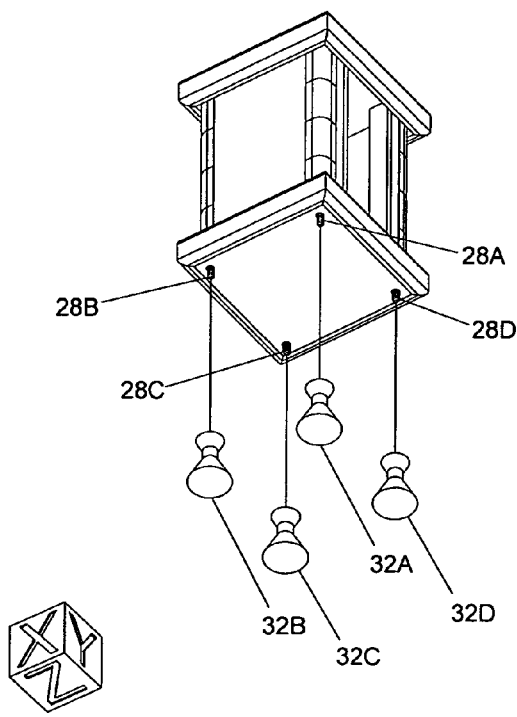
FIG. 56 is a perspective view of a Quick assembling Furniture assembly
Figure 57:
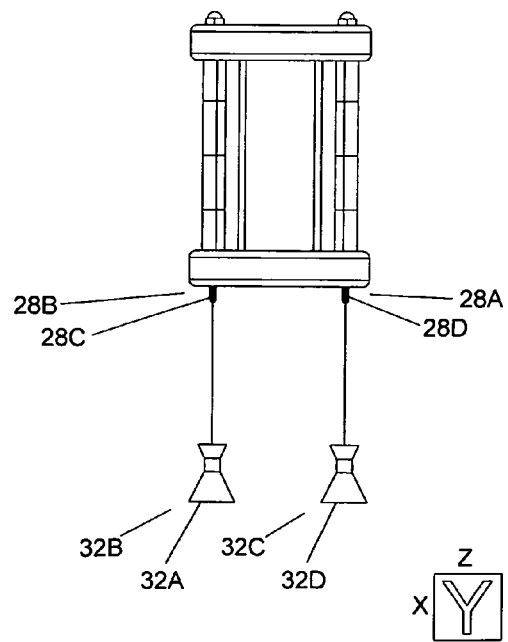
FIG. 57 is a front view of a Quick assembling Furniture assembly
Figure 62:
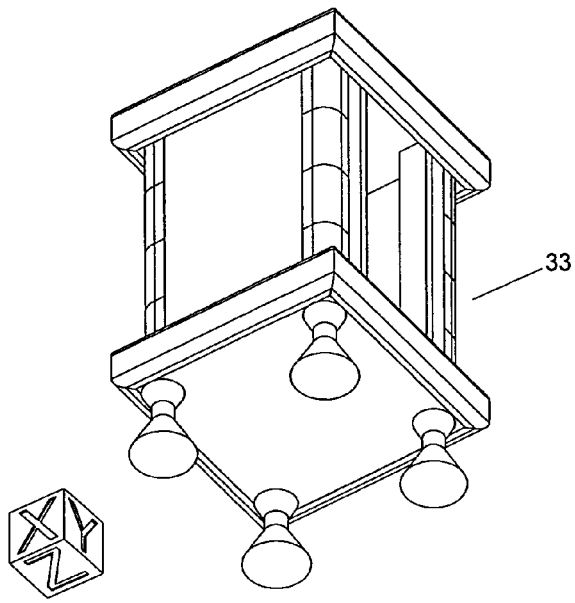
Figure 63:
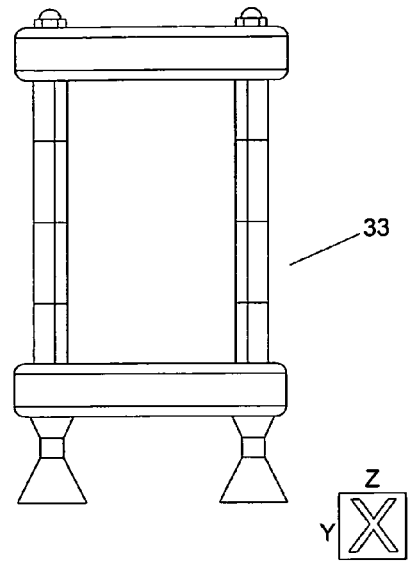
Figure 60:
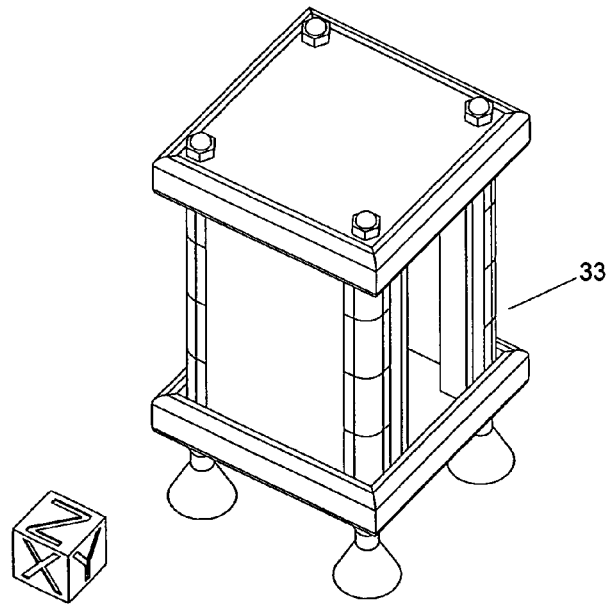
FIG. 60 is a perspective view of a Quick assembling Furniture assembly
Figure 61:
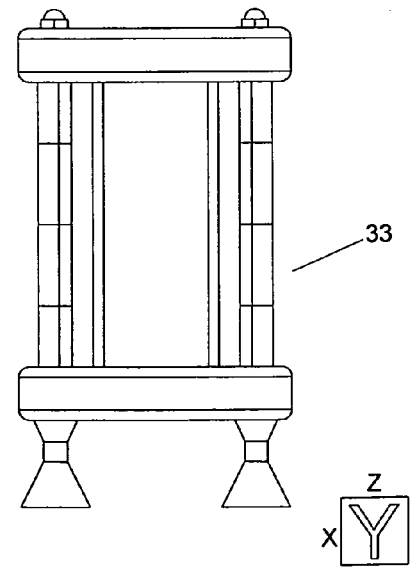
FIG. 61 is a side view of a Quick assembling Furniture assembly

We claim:

1. A lightweight piece of furniture, comprising:
   a. a plurality of panels, each panel comprising:
      i. an outer face;
      ii. an inner face; and
      iii. two panel edges disposed between the outer face and the inner face, each panel edge comprising:
         1. one or more segments configured to abut with one or more corresponding segments of a panel edge of an adjacent panel; and
         2. an aperture extending through each segment, wherein the outer face, the inner face, and the panel edges define a hollow channel;
   b. two or more corner panels, each corner panel comprising:
      i. a panel edge comprising:
         1. one or more segments configured to abut with one or more corresponding segments of a panel edge of an adjacent panel; and
         2. an aperture extending through each segment; and
      ii. a panel edge cover having a channel configured to matingly engage with a lip protruding from the panel edge to form a finished edge;
   c. a top cap comprising a plurality of apertures, wherein the top cap is in communication with an upper edge of the plurality of panels;
   d. a bottom cap comprising a plurality of apertures, wherein the bottom cap is in communication with a lower edge of the plurality of panels, wherein the apertures of the abutting segments axially align with one of the apertures extending through the top cap and the bottom cap to form a corner aperture;
   e. a plurality of rods, each rod configured to extend through one of the corner apertures, wherein at least an upper end and a lower end of each of the plurality of rods are threaded, wherein the upper end extends above the top cap, and wherein the lower end extends below the bottom cap; and
   f. a plurality of fasteners configured to threadingly engage with the upper ends and the lower ends of the rods, wherein the fasteners clamp the plurality of panels and the corner panels between the top cap and the bottom cap as the fasteners are tightened onto the rods.

2. The lightweight piece of furniture of claim 1, wherein the hollow channel of each of the plurality of panels is filled with a foam selected from the group consisting of polymeric spray foam and solid foam.

3. The lightweight piece of furniture of claim 1, wherein the top cap and the bottom cap each comprise:
   a. an outer edge;
   b. an interior panel; and
   c. an exterior panel, wherein the outer edge, the interior panel, and the exterior panel define a hollow core, wherein the hollow core is filled with a foam selected from the group consisting of polymeric spray foam and solid foam.

4. The lightweight piece of furniture of claim 1, wherein the plurality of fasteners engaged with the rods' lower ends are integrated within a plurality of feet.

5. The lightweight piece of furniture of claim 1, wherein the plurality of fasteners engaged with the rods' lower ends are feet.

6. The lightweight piece of furniture of claim 5, wherein a base of the feet is wider than a top of the feet, wherein at least one edge of the base laterally extends beyond the outer face of one or more of the plurality of panels.

7. A lightweight piece of furniture, comprising:
   a. a plurality of panels, each panel comprising:
      i. an outer face;
      ii. an inner face; and
      iii. two panel edges disposed between the outer face and the inner face, wherein the outer face, the inner face, and the panel edges define a hollow channel, wherein each panel edge comprises:
         1. one or more segments configured to abut with one or more segments of a panel edge of an adjacent panel, and
         2. an aperture extending through each segment, wherein the apertures of abutting segments axially align to form a corner aperture;
   b. two or more corner panels, each corner panel comprising:
      i. a panel edge comprising:
         1. one or more segments configured to abut with one or more corresponding segments of a panel edge of an adjacent panel; and
         2. an aperture extending through each segment; and
      ii. a panel edge cover having a channel configured to matingly engage with a lip protruding from the panel edge to form a finished edge;
   c. a top cap in communication with an upper edge of the plurality of panels, the top cap comprising a plurality of apertures, wherein each of the apertures extending through the top cap axially aligns with a corresponding corner aperture;
   d. a plurality of rods, each rod extending from a top surface of the furniture to a bottom surface of the furniture through one of the corner apertures, wherein at least an upper end and a lower end of each of the plurality of rods are threaded; and
   e. a plurality of fasteners configured to threadingly engage with the upper ends and the lower ends of the rods, wherein the fasteners clamp the furniture together as the fasteners are tightened onto the rods.

8. The lightweight piece of furniture of claim 7, wherein the hollow channel of each of the plurality of panels is filled with a foam selected from the group consisting of polymeric spray foam and solid foam.

9. The lightweight piece of furniture of claim 7, wherein the plurality of fasteners engaged with the rods' lower ends are integrated within a plurality of feet.

10. The lightweight piece of furniture of claim 7, wherein the plurality of fasteners engaged with the rods' lower ends are feet.

11. The lightweight piece of furniture of claim 10, wherein a base of the feet is wider than a top of the feet, wherein at least one edge of the base laterally extends beyond the outer face of one or more of the plurality of panels.

12. A lightweight piece of furniture, comprising:
   a. a plurality of panels, each panel comprising:
      i. an outer face;
      ii. an inner face; and
      iii. two panel edges disposed between the outer face and the inner face, wherein the outer face, the inner face, and the panel edges define a hollow channel, wherein each panel edge comprises:
         1. one or more segments configured to abut with one or more segments of a panel edge of an adjacent panel, and
         2. an aperture extending through each segment, wherein the apertures of abutting segments axially align to form a corner aperture;
   b. a plurality of rods, each rod extending from a top surface of the furniture to a bottom surface of the furniture through one of the corner apertures, wherein at least an upper end and a lower end of each of the plurality of rods are threaded; and
   c. a plurality of fasteners configured to threadingly engage with the upper ends and the lower ends of the rods, wherein the abutting segments are compressed together as the fasteners are tightened onto the rods.

13. The lightweight piece of furniture of claim 12, further comprising two or more corner panels, each corner panel comprising:
   i. a panel edge comprising:
      1. one or more segments configured to abut with one or more corresponding segments of a panel edge of an adjacent panel; and
      2. an aperture extending through each segment; and
   ii. a panel edge cover having a channel configured to matingly engage with a lip protruding from the panel edge to form a finished edge.

14. The lightweight piece of furniture of claim 12, wherein the hollow channel of each of the plurality of panels is filled with a foam selected from the group consisting of polymeric spray foam and solid foam.

15. The lightweight piece of furniture of claim 12, wherein the plurality of fasteners engaged with the rods' lower ends are integrated within a plurality of feet.

16. The lightweight piece of furniture of claim 12, wherein the plurality of fasteners engaged with the rods' lower ends are feet.

17. The lightweight piece of furniture of claim 16, wherein a base of the feet is wider than a top of the feet, wherein at least one edge of the base laterally extends beyond the outer face of one or more of the plurality of panels.

* * * * *